April 15, 1924.
G. W. COUTTS
1,490,662
PISTON AND CONNECTING ROD BEARING
Filed Feb. 8, 1922
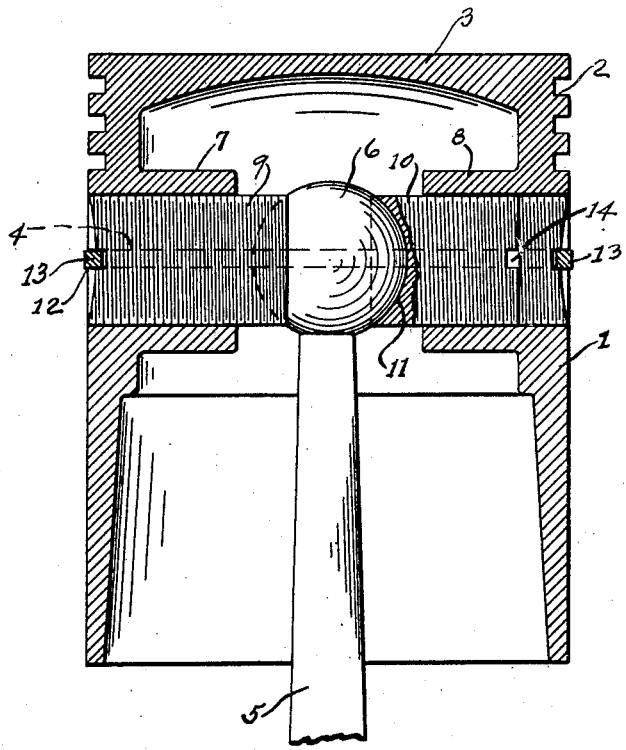
George W. Coutts
INVENTOR
BY
Erwin, Wheeler & Woolard
ATTORNEYS.

Patented Apr. 15, 1924.

1,490,662

UNITED STATES PATENT OFFICE.

GEORGE W. COUTTS, OF WAUKESHA, WISCONSIN.

PISTON AND CONNECTING-ROD BEARING.

Application filed February 8, 1922. Serial No. 535,073.

*To all whom it may concern:*

Be it known that I, GEORGE W. COUTTS, a citizen of the United States, residing at Waukesha, county of Waukesha, and State of Wisconsin, have invented new and useful Improvements in Piston and Connecting-Rod Bearings, of which the following is a specification.

This invention relates to connecting rod bearings for pistons.

It is the object of this invention to provide an adjustable connecting rod bearing of a novel and simplified form, whereby construction costs may be lessened and the necessity for replacement practically obviated.

Further objects of this invention are to provide means for adjusting a connecting rod bearing to take up wear upon either side, whereby uneven wear upon one side of the bearing may be corrected and the connecting rod maintained in alignment; to provide novel and effective means for maintaining the adjustable bearing in any required adjustment; to provide a bearing of unusual flexibility; and to provide a bearing capable of easy and quick manipulation when it is desired to remove the connecting rod or piston.

The drawing represents an axial section through a piston, such as is adapted for use in an internal combustion engine. The piston 1 is provided with a plurality of grooves 2 adjacent its head surface 3 for the reception of piston rings in the usual manner. An additional annular channel 4 is provided in the transverse plane of the pivot of the connecting rod.

The connecting rod 5 may be of any desired form so far as its cross section is concerned, but it is necessary to this invention that it be provided at its inner end with a sphere or ball such as is illustrated at 6. This sphere is adapted to replace the wrist-pin used in ordinary practice.

The wall of the piston 1 is preferably provided at 7 and 8 with a pair of diametrically opposed inwardly projecting bosses which are bored and threaded to receive the bearing screws 9 and 10, respectively.

Each of the bearing screws 9 and 10 is provided with a recess 11 in its outer face. This recess is carefully ground to conform to the spherical surface of the ball 6. Obviously the screws 9 and 10 may be so adjusted as to bear with any desired pressure upon the ball 6. A mechanic will be enabled by this invention to make an adjustment of screws 9 and 10 which will leave them in a perfect bearing relation to the ball 6, whereby wear will be reduced to a minimum. It will be noted that after wear has occurred in the bearing thus provided, the screws 9 and 10 can be turned to compensate precisely for the wear which has occurred. This compensatory adjustment can be made equally well whether the wear has occurred evenly upon both of the adjusted screws 9 and 10 or not.

To facilitate the turning of screws 9 and 10, they may be slotted as at 12 to permit the use of an ordinary screw driver. If desired, a plurality of intersecting slots 12 may be provided so that no matter what may be the position of the screws 9 or 10 one of said slots will be in registry with the circumferential groove 4. If a plurality of intersecting slots be thus provided, it will be clear that the screws 9 and 10 may be locked by a piston ring of ordinary construction passed about the piston and lying within the channel 4. Such a ring is indicated at 13 at the left hand side of the drawing.

As an alternative possible locking device, I have shown at the right hand side of the drawing, in association with the screw 10, a locking screw 14 which may be threaded into the piston to exert a locking pressure upon screw 10 in a well-known manner. If desired, the locking screw 14 may also be provided with a plurality of intersecting slots to receive the piston ring 13.

It will be clear to those skilled in the art that the bearing provided by the construction herein illustrated will satisfy the objects hereinbefore specified. This bearing is readily adjustable and is flexible to an unusual degree. It leaves the piston free to turn upon its own axis while reciprocating in the cylinder, and thereby tends to prevent the scoring of the cylinder wall. The bearing is so open and accessible that lubrication by the splash system is far more effective with this type of bearing than with bearings of ordinary construction.

I claim:

1. The combination with a piston having walls provided with internally projecting bosses and apertures therethrough having their axes in a common plane, of a piston rod having a spherical portion within the piston, and screws each having a spherical recess in one end, said screws being adapted to be introduced into the piston through said apertures in threaded engagement with the walls of said piston, whereby the spherical recess of each screw may be engaged with the spherical portion on said piston rod.

2. The combination with a piston having walls provided with internally projecting bosses, and apertures therethrough having their axes in a common plane and a circumferential groove intersecting the axis of said apertures; of a piston rod having a spherical portion within the piston; a piston ring for said groove and screws each having a spherical recess in one end and a transverse slot in the other end, said screws being adapted to be introduced into the piston through said apertures in threaded engagement with the walls of said piston, whereby the spherical recess of each screw may be engaged with the spherical portion on said piston rod and the transverse slot of each screw may be registered with the circumferential groove on said piston to receive said piston ring in locking engagement therewith.

GEORGE W. COUTTS.